US012528374B2

(12) United States Patent
Lee et al.

(10) Patent No.: US 12,528,374 B2
(45) Date of Patent: Jan. 20, 2026

(54) APPARATUS FOR CONTROLLING CHARGING OR DISCHARGING OF VEHICLE, SYSTEM FOR SUPPLYING POWER TO OUTSIDE OF THE VEHICLE, AND METHOD THEREOF

(71) Applicants: Hyundai Motor Company, Seoul (KR); Kia Corporation, Seoul (KR)

(72) Inventors: Myoung Seok Lee, Seoul (KR); Soung Han Noh, Gyeonggi-do (KR); Kwang Moo Lee, Gyeonggi-do (KR); Jun Yeon Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 512 days.

(21) Appl. No.: 17/392,808

(22) Filed: Aug. 3, 2021

(65) Prior Publication Data

US 2022/0194249 A1     Jun. 23, 2022

(30) Foreign Application Priority Data

Dec. 22, 2020 (KR) .................. 10-2020-0181034

(51) Int. Cl.
*B60L 53/60*     (2019.01)
*B60L 53/16*     (2019.01)
*B60L 55/00*     (2019.01)

(52) U.S. Cl.
CPC ............ *B60L 53/60* (2019.02); *B60L 53/16* (2019.02); *B60L 55/00* (2019.02)

(58) Field of Classification Search
CPC .......... B60L 53/60; B60L 55/00; B60L 53/16
See application file for complete search history.

(56) References Cited

U.S. PATENT DOCUMENTS

| 9,834,107 | B2* | 12/2017 | Ono ..................... H01R 13/701 |
| 2015/0298568 | A1* | 10/2015 | Mitsutani ............... B60L 58/13 |
| | | | 180/65.21 |
| 2016/0056589 | A1* | 2/2016 | Kagawa ............ H01R 13/6683 |
| | | | 361/42 |

(Continued)

FOREIGN PATENT DOCUMENTS

JP          5735050 B2      6/2015

OTHER PUBLICATIONS

Shigeki Kinomura, Hironobu Kusafuka, Kensuke Kamichi, and Tomoya Ono, "Development of Vehicle Power Connector Equipped with Outdoor Power Outlet Using Vehicle Inlet of Plug-In Hybrid Vehicle", SAE Technical Paper 2013-01-1442, 2013.

*Primary Examiner* — Scott A Browne
*Assistant Examiner* — Terry C Buse
(74) *Attorney, Agent, or Firm* — Fox Rothschild LLP

(57)     ABSTRACT

A charging and discharging control apparatus for a vehicle is provided. The apparatus for a vehicle includes a processor that controls charging and discharging of electric energy of the vehicle and a storage that stores data and algorithms driven by the processor. The processor senses a voltage of a proximity detection signal line to determine whether a discharging connector for supplying a voltage to an outside of the vehicle or a charging connector for supplying a voltage to an inside of the vehicle is connected to an inlet of the vehicle, and determines whether a discharging start command is applied by sensing a voltage of a control pilot signal line when the discharging connector is connected.

12 Claims, 14 Drawing Sheets

(56) References Cited

U.S. PATENT DOCUMENTS

| | | | |
|---|---|---|---|
| 2016/0152154 A1* | 6/2016 | Mizuno | B60L 53/18 |
| | | | 307/10.1 |
| 2018/0013304 A1* | 1/2018 | Ono | B60L 1/006 |
| 2021/0119627 A1* | 4/2021 | Lee | H02M 7/53871 |

* cited by examiner

APPARATUS FOR CONTROLLING CHARGING OR DISCHARGING OF VEHICLE, SYSTEM FOR SUPPLYING POWER TO OUTSIDE OF THE VEHICLE, AND METHOD THEREOF

CROSS-REFERENCE TO RELATED APPLICATION

This application claims priority to and benefits of Korean Patent Application No. 10-2020-0181034, filed on Dec. 22, 2020, the entire contents of which are incorporated herein by reference.

BACKGROUND

(a) Field of the Disclosure

The present disclosure relates to a charging and discharging control apparatus for a vehicle, a vehicle charging and discharging system including the same, and a method thereof.

(b) Description of the Related Art

Plug-in hybrid vehicles (PHEV) and electric vehicles (EV) charge electricity from an external power source and drive the vehicle as a power source. A power line, a control pilot (CP) line, and a PD proximity detection (PD) line are connected to charge electricity from an electric vehicle supply equipment (EVSE).

As illustrated in FIG. 1, the power line is connected from a power supply of the EVSE 20 (EVSE) to an on board charger (OBC) of a vehicle system 10. The CP line is a passage for exchanging information between the EVSE and a vehicle, and a control board of the EVSE and a vehicle charge management system) are connected. The PD line detects whether a connector of the power supply and an inlet of the vehicle are correctly engaged.

A technique for supplying power to an inside or outside of the vehicle is called a V2L (vehicle to load) technique. With the V2L technique, an electric vehicle serves as a power storage device or a secondary power supply, and power can be supplied to the outside in the case of camping or an emergency. For example, electricity for cooking utensils, refrigerators, lightings, electric heaters, and the like required at campgrounds can be obtained from the vehicle.

Conventionally, when power is supplied to the outside of the vehicle, a button for supplying power is mounted on an in-vehicle device, to supply power to the outside of the vehicle while boarding the vehicle, which is inconvenient. In addition, conventionally, when a connector for supplying power to the outside of a vehicle is engaged with an inlet, it is difficult to recognize a closed state of a discharging start button for supplying power.

The above information disclosed in this section is merely for enhancement of understanding of the background of the disclosure, and therefore, it may contain information that does not form the prior art that is already known in this country to a person of ordinary skill in the art.

SUMMARY

An exemplary embodiment of the present disclosure has been made in an effort to provide a charging and discharging control apparatus for a vehicle, a vehicle charging and discharging system including the same, and a method thereof, capable of performing discharge by more accurately recognizing a closed state of a discharging start button for supplying power to an outside of the vehicle.

The technical objects of the present disclosure are not limited to the objects mentioned above, and other technical objects not mentioned can be clearly understood by those skilled in the art from the description of the claims.

An exemplary embodiment of the present disclosure provides a charging and discharging control apparatus for a vehicle that may include: a processor configured to control charging and discharging of electric energy of the vehicle; and a storage configured to store data and algorithms driven by the processor. The processor may be configured to sense a voltage of a proximity detection (PD) signal line to determine whether a discharging connector for supplying a voltage to an outside of the vehicle or a charging connector for supplying a voltage to an inside of the vehicle is connected to an inlet of the vehicle, and determine whether a discharging start command is applied by sensing a voltage of a control pilot (CP) signal line when the discharging connector is connected.

In an exemplary embodiment, the processor may be configured to determine whether a PD sensing voltage sensed in a PD signal line satisfies a first voltage range, and when the first voltage range is satisfied, may be configured to determine that both the charging connector and the discharging connector are not connected, to perform neither charging nor discharging. In addition, the processor may be configured to determine whether the PD sensing voltage satisfies a second voltage range that is lower than the first voltage range, and when the second voltage range is satisfied, may be configured to determine that the charging connector is connected, to perform charging.

In an exemplary embodiment, the processor may be configured to determine whether the PD sensing voltage satisfies a third voltage range that is lower than the second voltage range, and when the third voltage range is satisfied, may be configured to determine that the discharging connector is connected. In addition, the processor may be configured to determine whether a level of the CP sensing voltage sensed in the CP signal line has increased above a predetermined value in a state where the PD sensing voltage satisfies the third voltage range, and when the CP signal line has increased above the predetermined value, may be configured to determine that the discharging start command is applied, to perform discharging. In an exemplary embodiment, the processor, when the PD sensing voltage satisfies a fourth voltage range between the first voltage range and the second voltage range, may be configured to determine that the charging connector or the discharging connector is connected but a connector latch switch is open, to perform neither charging nor discharging.

In addition, the processor may be configured to determine whether the PD sensing voltage satisfies a third voltage range that is lower than the second voltage range, and when the third voltage range is satisfied, may be configured to determine that the discharging connector is connected, and when a level of the CP sensing voltage sensed in the CP signal line has increased above a predetermined value in a state where the PD sensing voltage satisfies the third voltage range, may be configured to determine that the discharging start command is applied, to perform discharging. In an exemplary embodiment, the processor, when the PD sensing voltage satisfies a fifth voltage range that is lower than the third voltage range while discharging is in progress, may be configured to determine that the connector latch switch is open, to stop the discharging.

An exemplary embodiment of the present disclosure provides a charging and discharging system for a vehicle that may include: a control pilot (CP) circuit configured to receive a CP signal from a charging station system; a proximity detection (PD) circuit configured to determine whether a charging connector or a discharging connector is connected; and a charging and discharging control apparatus configured to determine whether a discharging connector for supplying a voltage to an outside of the vehicle or a charging connector for supplying a voltage to an inside of the vehicle is connected to an inlet of the vehicle by sensing a voltage of an output terminal of the PD circuit, and configured to determine whether a discharging start command is applied by sensing a voltage of an output terminal of the CP circuit when the discharging connector is connected.

In an exemplary embodiment, the PD circuit may include a resistance element configured to apply a power supply voltage of a power supply voltage terminal to a PD signal line by dropping it. In addition, the CP circuit may include a diode configured to rectify a voltage of the CP signal; a resistance element connected between an output terminal of the diode and a ground voltage terminal; a first amplifier configured to amplify a voltage of an output terminal of the resistance element; and a second amplifier configured to amplify an output voltage of the first amplifier. In an exemplary embodiment, the CP circuit may further include first and second buffers each configured to buffer an output voltage of the second amplifier.

The CP circuit may further include: a first switch that is a discharging start button having a first side connected to the CP circuit and a second side connected to the PD circuit, and a second switch that is a connector latch button provided at the second side of the first switch. In an exemplary embodiment, the discharging connector may further include: a first resistance element connected between a ground voltage terminal and a PD signal line connected to the PD circuit in parallel with the second switch; and a second resistance element connected in series between output terminals of the first resistance element and the second switch and the PD signal line. In addition, the discharging connector may further include: a first switch that is a discharging start button having a first side connected to the CP circuit and a second side connected to the PD circuit, and a resistance element connected between a PD signal line of the PD circuit and a ground voltage terminal.

An exemplary embodiment of the present disclosure provides a charging and discharging control method for a vehicle that may include: determining whether a discharging connector for supplying a voltage to an outside of the vehicle or a charging connector for supplying a voltage to an inside of the vehicle is connected to an inlet of the vehicle by sensing a voltage of a proximity detection (PD) signal line; and determining whether a discharging start command is applied by sensing a voltage of a control pilot (CP) signal line when the discharging connector is connected.

In an exemplary embodiment, the determining of whether the connector is connected to the inlet of the vehicle may include: determining whether a PD sensing voltage sensed in the PD signal line satisfies a first voltage range; and determining that both the charging connector and the discharging connector are not connected when the first voltage range is satisfied, perform neither charging nor discharging. The determining of whether the connector is connected to the inlet of the vehicle may include: determining whether the PD sensing voltage satisfies a second voltage range that is lower than the first voltage range; and determining that the charging connector is connected to perform charging when the second voltage range is satisfied.

In an exemplary embodiment, the determining of whether the connector is connected to the inlet of the vehicle may include: determining whether the PD sensing voltage satisfies a third voltage range that is lower than the second voltage range; and determining that the discharging connector is connected when the third voltage range is satisfied. In addition, the determining of whether the discharging start command is applied may include determining whether a level of the CP sensing voltage sensed in the CP signal line has increased above a predetermined value in a state where the PD sensing voltage satisfies the third voltage range, and when the CP signal line has increased above the predetermined value, determining that the discharging start command is applied, to perform discharging.

According to the present technique, it may be possible to perform discharge by more accurately recognizing a closed state of a discharging start button for supplying power to an outside of the vehicle. In addition, various effects that can be directly or indirectly identified through this document may be provided.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
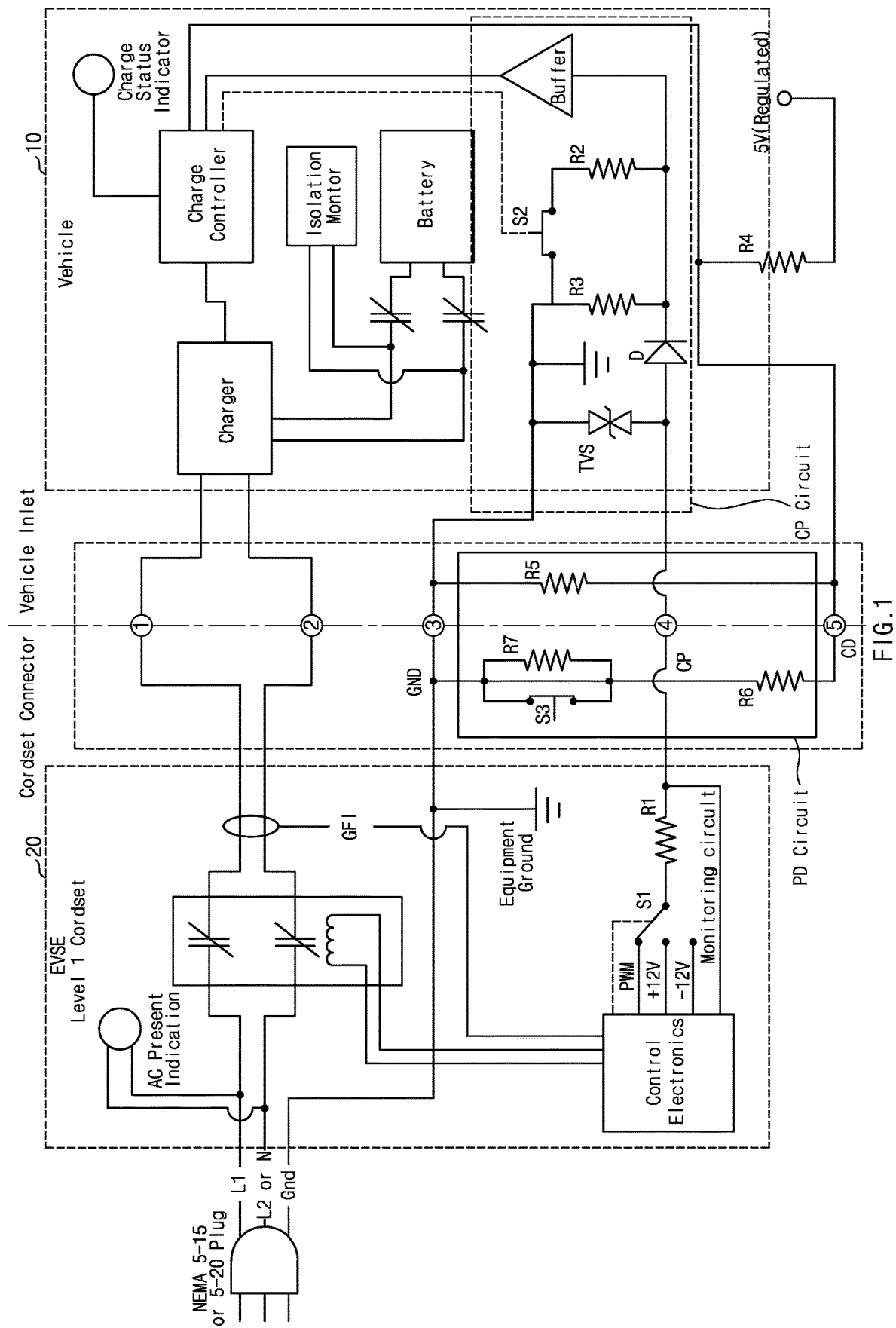
FIG. 1 illustrates a schematic diagram of a charging system for a general vehicle according to the prior art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 2 to FIG. 14. Hereinafter, a vehicle of the present disclosure may include all vehicles that charge and discharge electrical energy, such as an electric vehicle.

Figure 2:
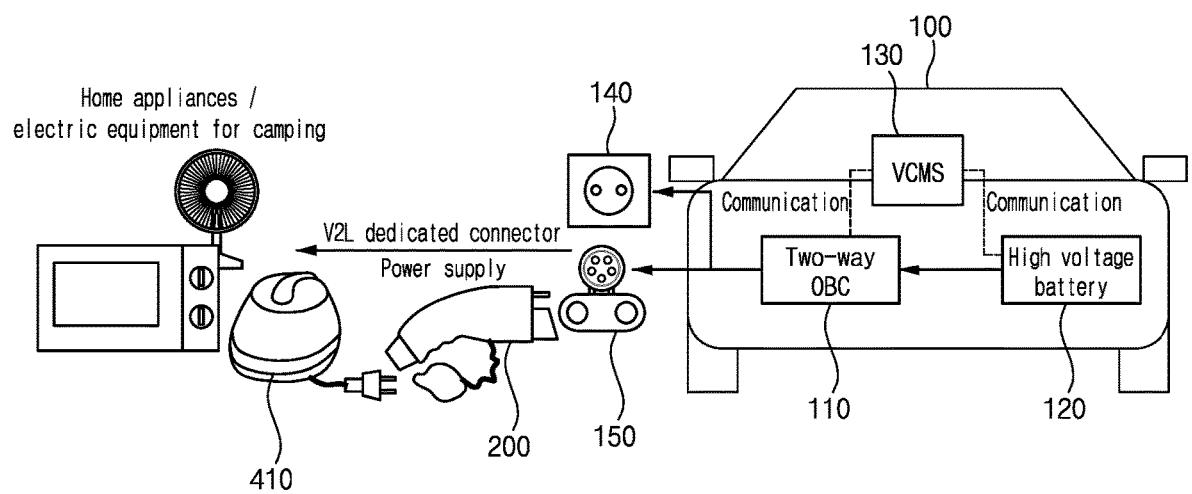
FIG. 2 illustrates a general schematic diagram showing a charging and discharging system for a vehicle according to an exemplary embodiment of the present disclosure.

FIG. 2 illustrates a general schematic diagram showing a charging and discharging system for a vehicle according to an exemplary embodiment of the present disclosure. Referring to FIG. 2, the vehicle charging and discharging system may include a vehicle system 100 and a discharging connector 200 connected to the vehicle system 100. The vehicle system 100 may include a two-way OBC 110, a high voltage battery 120, a vehicle charging and discharging control system 130, an electric cord 140 for an indoor of the vehicle, and a charging port inlet 150 for an outdoor of the vehicle.

The two-way OBC 110 may be configured to supply electricity from a charging station system to a vehicle, or supply electrical energy stored in the vehicle from the vehicle to the outside of the vehicle. The high voltage battery 120 may be configured to store electrical energy supplied from a charging station.

The vehicle charging and discharging control system 130 is a vehicle charge management system (VCMS), which is a controller for generally charging and discharging an electric vehicle. The vehicle charging and discharging control system 130 may include a control pilot (CP) circuit that exchanges information with an external charging station system and a proximity detection (PD) circuit that detects whether a connector and an inlet of the vehicle are correctly connected. In particular, a CP signal is a signal for exchanging vehicle information between the charging station system and the vehicle system 100. The PD signal is a signal for detecting whether the connector for charging or discharging and an inlet of the vehicle are correctly connected.

The vehicle charging and discharging control system 130 may distinguish whether a slow or fast charging connector is connected to a vehicle charging port inlet 150 for charging electricity to the vehicle, or whether the discharging connector 200 for supplying power to the outside of the vehicle is connected thereto. In addition, when the discharging start button V2L START (S4) is pressed or otherwise engaged in a state where the discharging connector 200 is connected to the inlet of the charging port of the vehicle, the vehicle charging and discharging control system 130 may be configured to recognize this connection. The electric cord 140 for an indoor of the vehicle is mounted in the interior of the vehicle, and a plug (e.g., a 220 VAC plug, 410) of an electrical device may be inserted and used when electric use is required in the interior of the vehicle.

The vehicle charging port inlet 150 may be connected to a charging connector for supplying voltage to the vehicle or the discharging connector 200 for supplying voltage to the outside of the vehicle. The discharging connector 200 serves as a gender between the vehicle charging port inlet 150 and the plug 410. The discharging connector 200 supplies vehicle power to the outside of the vehicle, and is also referred to as a V2L (vehicle to load) connector. For example, electricity for cooking utensils, refrigerators, lightings, electric heaters, and the like required at campgrounds may be obtained from the vehicle by connecting the discharging connector 200 to the vehicle.

The discharging connector 200 has a first side of 5 pins or 7 pins, such as the vehicle charging port inlet 150, and a second side into which a plug may be inserted. Power lines AC1, AC2, and GND, and a PD (proximity detection) signal line for detecting whether a connector is connected may be connected between the discharging connector 200 and the vehicle charging and discharging control system 130. This will be described in more detail later with reference to FIG. 6 and FIG. 7.

Figure 3:
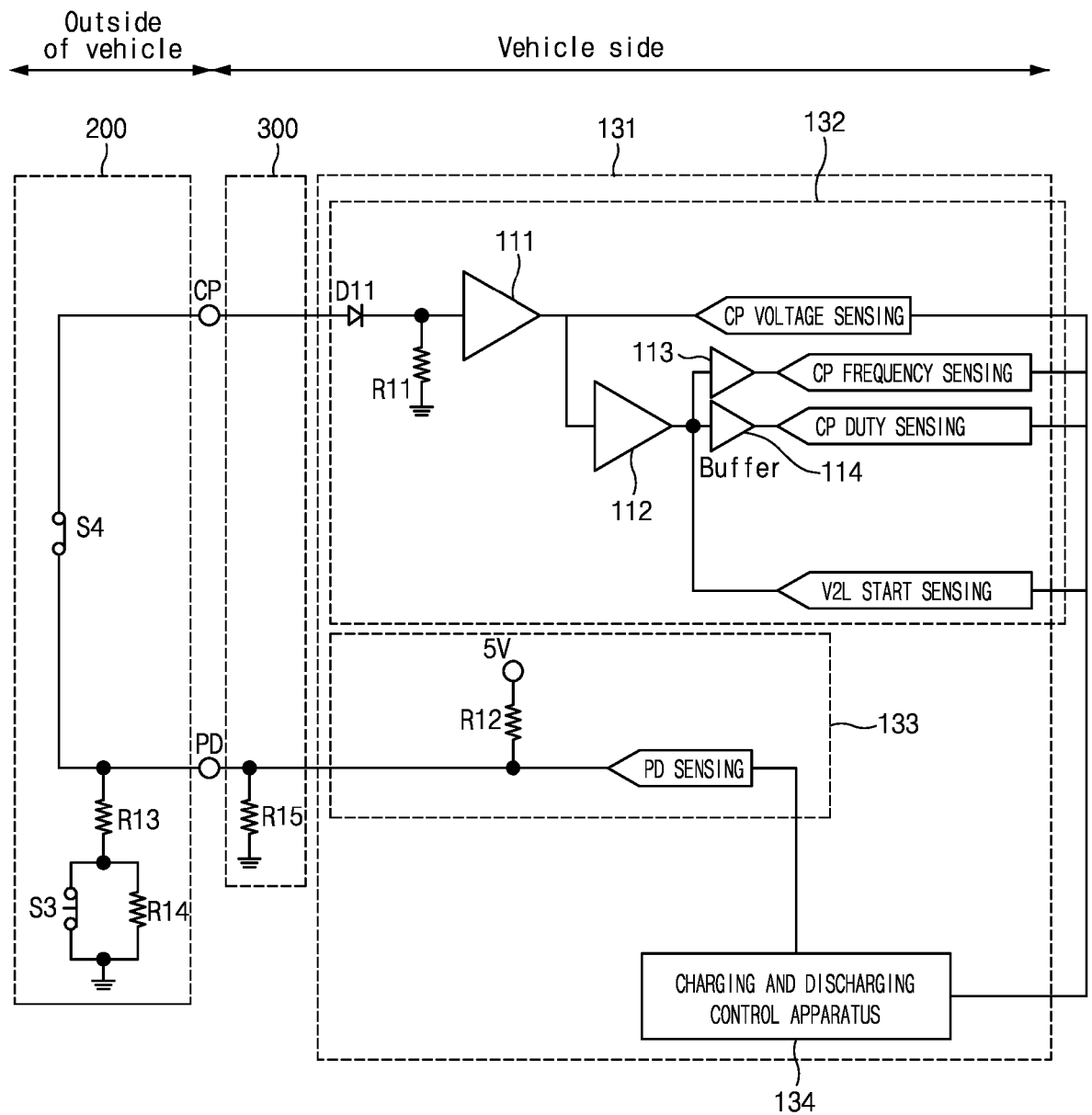
FIG. 3 illustrates a schematic diagram of a charging and discharging system for a vehicle according to an exemplary embodiment of the present disclosure.

FIG. 3 illustrates a schematic diagram of a charging and discharging system for a vehicle according to an exemplary embodiment of the present disclosure. Referring to FIG. 3, the charging and discharging system may include a charging and discharging control system 131 for a vehicle, a discharging connector 200, and an inlet 300. The charging and discharging control system 131 according to an exemplary embodiment of the present disclosure may include a CP circuit 132, a PD circuit 133, and a charging and discharging control apparatus 134.

The CP circuit 132 may include a diode D11, a resistor R11, a differential amplifier (OP AMP) 111 and 112, and buffers 113 and 114. For example, the resistor R11 may have 3.3 kΩ, an amplification value of the differential amplifier 111 may be 0.3 times, and an amplification value of the differential amplifier 112 may be 3 times but the present disclosure is not limited thereto. The PD circuit 133 includes a resistor R12, and the resistor R12 is provided between a power supply voltage 5V and a PD signal line to drop a power supply voltage.

A CP signal generated by the charging station system, i.e., a CP signal for charging, has a form of 1 kHz PWM in the range of −12 V to 12 V. It must be converted into a range of 0 to 5V, which is a recognition range of a microcomputer in order to sense the CP signal for charging in the microcomputer (e.g., the charging and discharging control apparatus 134). Accordingly, the charging and discharging control apparatus 134 rectifies the CP signal through a diode D1 to convert it into a range of 0 to 12 V, and then amplifies it by 0.3 times through the differential amplifier 111 (Op-amp) to convert it into a range of 0 to 4 V so as to sense the CP signal.

Meanwhile, it is difficult to sense a frequency and duty of the CP signal when a level of the CP voltage is less than 2 V. Accordingly, the charging and discharging control apparatus 134 may be configured to amplify the CP signal 0.3 times amplified from the differential amplifier 111 through the differential amplifier 112 3 times to convert it into a range of 0 to 12 V, and constantly generate a voltage level through each of the buffers 113 and 114 regardless of a magnitude of an input voltage of the CP signal to sense the frequency and duty of the CP signal.

The charging and discharging control apparatus 131 may be configured to distinguish a charging connector of a charging station system and the discharging connector 200 (V2L connector) for external power supply based on the PD circuit 133. In addition, the charging and discharging control apparatus 131 may be configured to distinguish an open state and a closed state of a switch S4 through a CP signal line when the discharging connector 200 is connected to the inlet. In other words, since the discharging connector 200 does not generate a CP signal, the open state and the closed state of the switch S4 may be distinguished by using the CP signal line. Herein, a port for sensing the state of the switch S4, which is a discharging start button of the discharging connector 200, is referred to as V2L START sensing.

The discharging connector 200 may include resistors R13 and R14, and switches S3 and S4. For example, R13 may have 62 Ω, and R14 may have 430 Ω, but the present disclosure is not limited thereto. The switch S3 is a connector latch button, and is a button for connector connection. When the switch S3 is closed in a state where the connector is connected, it may be determined that the charging connector for charging is connected. The switch S3 and the resistor R14 may be connected in parallel, a first side may be connected to a ground voltage terminal, and a second side may be connected to a first side of the resistor R13. A second side of the resistor R13 is connected to the PD signal line. The switch S4 is a button for starting power supply (discharge) to the outside of the vehicle. The switch S4 may be connected between the CP signal line and the PD signal line.

The inlet 300 may include a resistor R15 for diagnosing the disconnection of the PD signal line between the inlet 300 and the charging and discharging control system 131. The resistor R15 may be connected between the PD signal line and the ground voltage terminal. For example, the resistor R15 may have 2.7 KΩ, but the present disclosure is not limited thereto.

In the open state of the switch S4, the PD sensing voltage may be changed based on the open or closed state of the switch S3, the charging and discharging control apparatus 134 may be configured to recognize whether the charging connector or the discharging connector is connected according to the change of the PD sensing voltage. In addition, the charging and discharging control apparatus 134 may be configured to determine the open or closed state of the discharging start button by sensing a voltage of the CP signal line that changes based on the open or closed state of the discharging start button that are changed based on the open or closed state of the switch S4 based on a line of the CP circuit 132.

Figure 4:
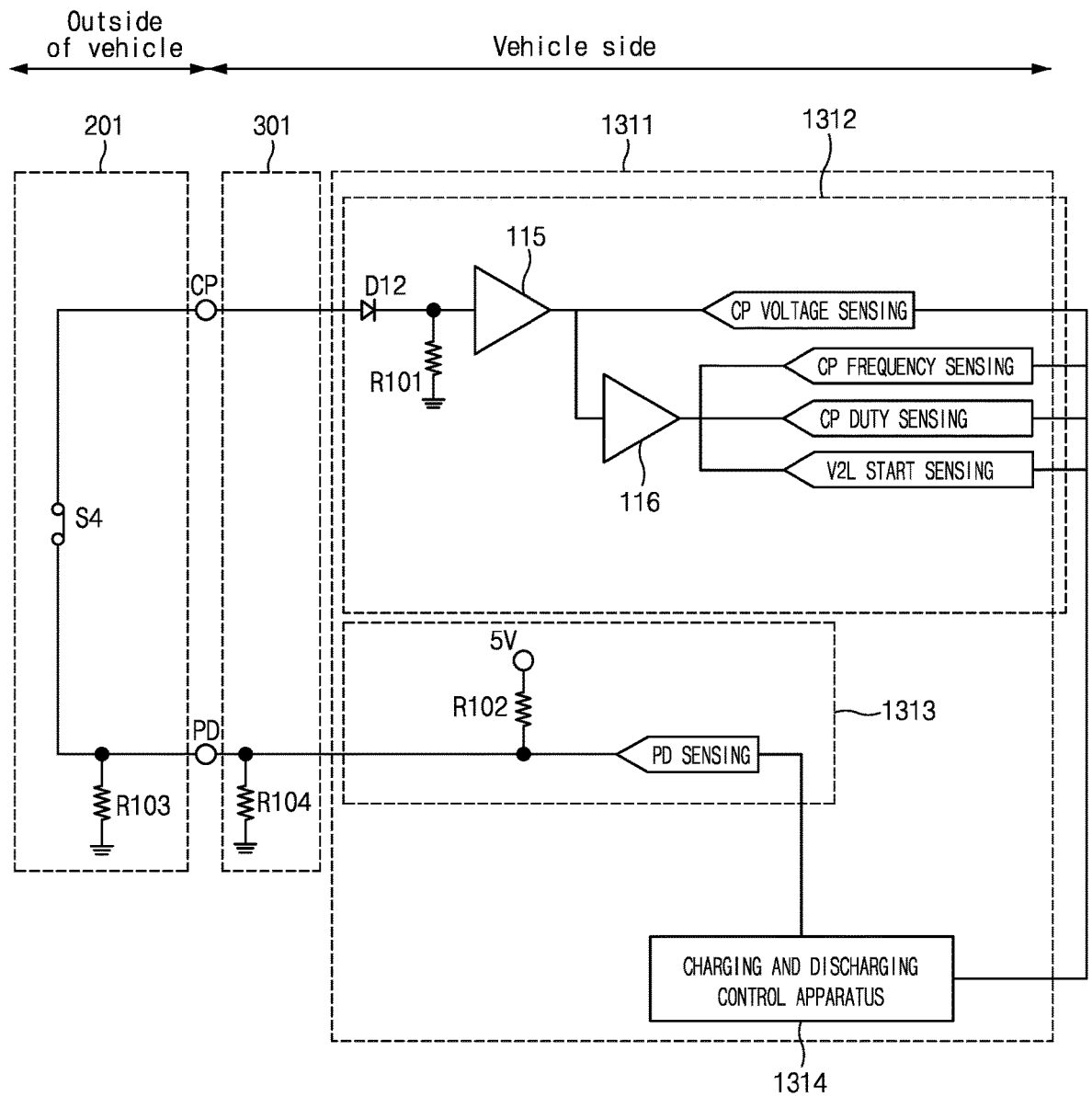
FIG. 4 illustrates a schematic diagram showing a charging and discharging system for a vehicle according to another exemplary embodiment of the present disclosure.

FIG. 4 illustrates a schematic diagram showing a charging and discharging system for a vehicle according to another exemplary embodiment of the present disclosure. Referring to FIG. 4, the charging and discharging system may include a charging and discharging control system 1311 for a vehicle, a discharging connector 201, and an inlet 301. The charging and discharging control system 1311 according to an exemplary embodiment of the present disclosure may include a CP circuit 1312, a PD circuit 1313, and a charging and discharging control apparatus 1314.

The CP circuit 132 may include a diode D12, a resistor R101, a differential amplifiers (OP AMP) 113 and 116. For example, the resistor R101 may have 3.3 kΩ, an amplification value of the differential amplifier 111 may be 0.3 times, and an amplification value of the differential amplifier 112 may be 3 times. The PD circuit 1313 includes a resistor R102, and the resistor R102 is provided between a power supply voltage 5V and a PD signal line to drop a power supply voltage.

The discharging connector 201 may include a resistor R103, and a switch S4. For example, the resistor R103 may have 75 KΩ. The switch S4 is a button for starting power supply (discharge) to the outside of the vehicle. The switch S4 may be connected between the CP signal line and the PD signal line. The inlet 300 may include a resistor R104 for diagnosing the disconnection of the PD signal line between the inlet 300 and the charging and discharging control system 131. The resistor R104 may be connected between the PD signal line and the ground voltage terminal. For example, the resistor R104 may have 2.7 KΩ.

Figure 5:
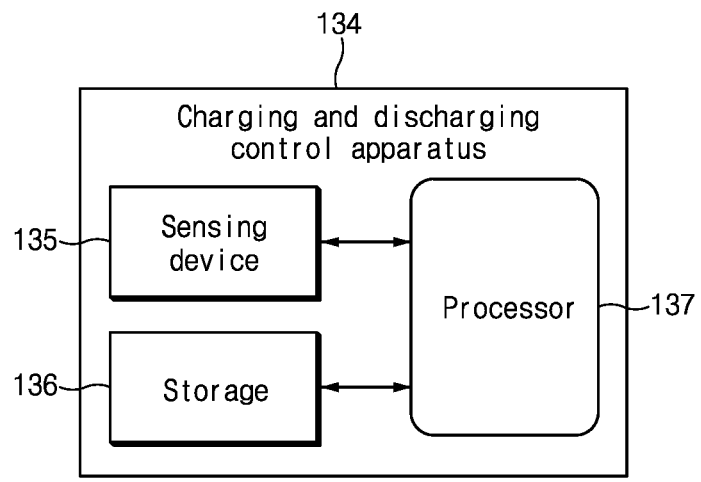
FIG. 5 illustrates a detailed schematic diagram of a charging and discharging control apparatus according to an exemplary embodiment of the present disclosure.

FIG. 5 illustrates a detailed schematic diagram of a charging and discharging control apparatus 134 according to an exemplary embodiment of the present disclosure. In FIG. 5, only the charging and discharging control apparatus 134 of FIG. 3 is illustrated, but the charging and discharging control apparatus 1314 has a same detailed configuration. The charging and discharging control apparatus 134 for external supply of vehicle power according to the exemplary embodiment of the present disclosure may be implemented inside the vehicle, may be implemented integrally with the internal control units of the vehicle, or may be implemented separately.

Referring to FIG. 5, the charging and discharging control apparatus 134 may include a sensing device 135, a storage 136, and a processor 137. The sensing device 135 may be configured to sense a voltage of the CP signal, a frequency of the CP signal, a duty of the CP signal, an open or closed state of the discharging start button S4, a voltage of the PD signal, and the like during charging.

The storage 136 may be configured to store data and algorithms that are operated by the processor 137. As an example, the storage 136 may be configured to store a voltage level range of the PD signal for determining whether the discharging connector 200 and the inlet 300 are connected and whether the discharging start button is started. The voltage level range of the PD signal will be described in detail later with reference to FIG. 10 and FIG. 12. The storage 136 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 137 may be electrically connected to the sensing device 135, the storage 136, and the like, may electrically control each component, and may be an electrical circuit that executes software commands, thereby performing various data processing and calculations described below. The processor 137 may process signals transferred between constituent elements of the vehicle charging and discharging control system 131. The processor 137 may be, e.g., a controller such as an engine control unit (ECU), a transmission control unit (TCU), a battery management system (BMS), a motor control unit (MCU) mounted in a vehicle.

The processor 137 may be configured to sense the voltage of the PD signal line to determine whether a discharging connector for supplying a voltage to an outside of the vehicle or a charging connector for supplying a voltage to an inside of the vehicle is connected to the inlet of the vehicle. In addition, the processor 137 may be configured to sense the voltage of the CP signal line, and when the discharging connector 200 is connected, the processor 137 may be configured to determine whether the discharging start button S4 is closed to determine whether a discharging start command has been applied thereto.

The processor 137 may be configured to determine whether a PD sensing voltage sensed in a PD signal line satisfies a first voltage range, and when the first voltage range is satisfied, determine that both the charging connector and the discharging connector 200 are not connected, to perform neither charging nor discharging. For example, the first voltage range may be 3.5 V or more and less than 4.7 or 4.0 V or more and less than 4.7 V.

The processor 137 may be configured to determine whether the PD sensing voltage satisfies a second voltage range that is lower than the first voltage range, and when the second voltage range is satisfied, may be configured to determine that the charging connector is connected to perform charging. For example, the second voltage range may be 1.2 V or more and less than 2.0 V or 1.0V=or more and less than 4.0 V. The processor 137 may be configured to determine whether the PD sensing voltage satisfies a third voltage range that is lower than the second voltage range, and when the third voltage range is satisfied, may be configured to determine that the discharging connector is connected. For example, the third voltage range may be 0.1 V or more and less than 1.2 V or 0.1 V or more and less than 1.0 V.

The processor 137 may be configured to determine whether a level of the CP sensing voltage sensed in the CP signal line has increased above a predetermined value in a state where the PD sensing voltage satisfies the third voltage range, and when the CP signal line has increased above the predetermined value, may determine that the discharging start command is applied, to perform discharging. For example, the CP sensing voltage may be 0 V before the discharging start command is applied, and then increase to 0.34 V after the discharging start command is applied. In addition, the CP sensing voltage may be 0 V before the discharging start command is applied, and then increase to 0.4 V after the discharging start command is applied.

When the PD sensing voltage satisfies a fourth voltage range between the first voltage range and the second voltage range, the processor 137 may be configured to determine that the charging connector or the discharging connector is connected but the connector latch switch S3 is open, to perform neither charging nor discharging. For example, the fourth voltage range may be 2.0 V or more and less than 3.5 V. When the PD sensing voltage satisfies a fifth voltage range that is lower than the third voltage range while discharging is in progress, the processor 137 may be configured to determine that the connector latch switch S3 is open to stop the discharging. For example, the fifth voltage range may be 2.0 V or more and less than 3.5 V.

Figure 6:
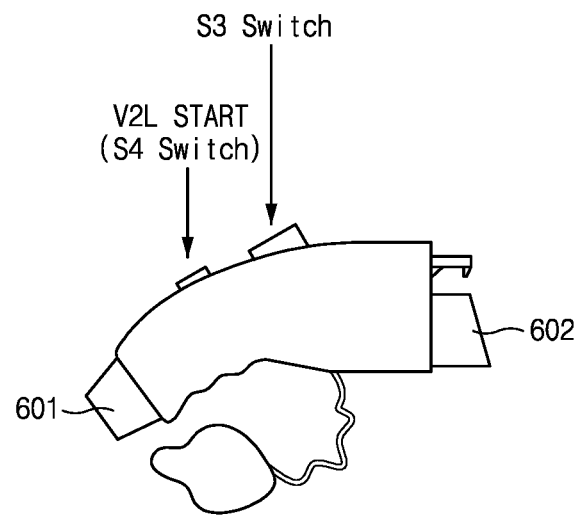
FIG. 6 illustrates an outer appearance of a discharging connector for externally supplying vehicle power according to an exemplary embodiment of the present disclosure.

FIG. 6 illustrates an outer appearance of a discharging connector for externally supplying vehicle power according to an exemplary embodiment of the present disclosure. Referring to FIG. 6, the discharging connector 200 for external supply of vehicle power includes a connection portion 601 connected to a plug at a first side of a body, and a connection portion 602 connected to an inlet of a charging port of the vehicle at an opposite side to the connection portion 601, a connector latch button S3, and a discharging start button S4.

Figure 7:
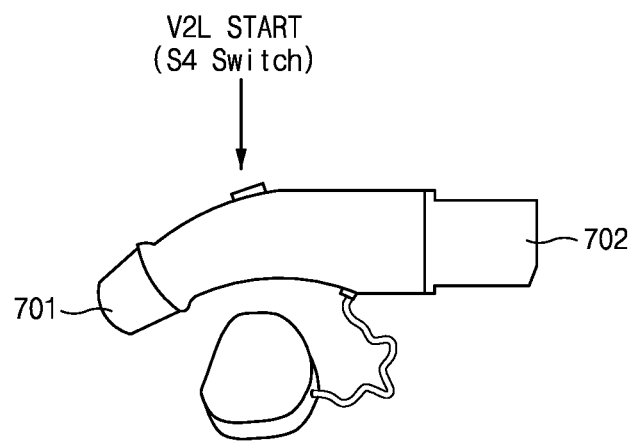
FIG. 7 illustrates an outer appearance of a discharging connector for externally supplying vehicle power according to another exemplary embodiment of the present disclosure.

FIG. 7 illustrates an outer appearance of a discharging connector for externally supplying vehicle power according to another exemplary embodiment of the present disclosure. Referring to FIG. 7, the discharging connector 200 includes a connection portion 701 connected to a plug at a first side of a body, and a connection portion 702 connected to an inlet of a charging port of the vehicle at an opposite side to the connection portion 701, and a discharging start button S4. Accordingly, the discharging connector 200 according to another exemplary embodiment of the present disclosure does not include the connector latch button S3.

Figure 8:
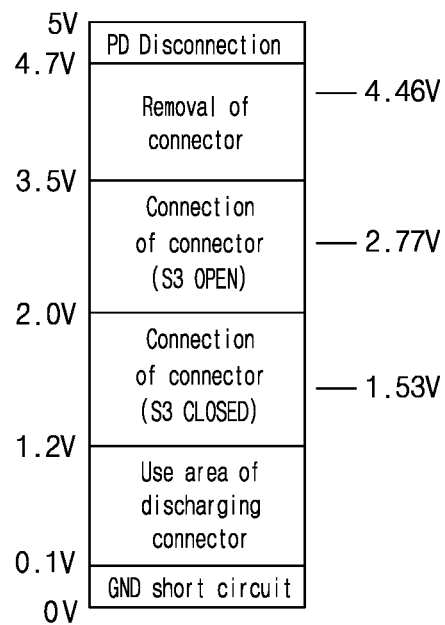
FIG. 8 illustrates an exemplary diagram of a use range of a PD sensing voltage for determining connection of a discharging connector for external supply of a vehicle power according to an exemplary embodiment of the present disclosure.

FIG. 8 illustrates an exemplary diagram of a use range of a PD sensing voltage for determining connection of a discharging connector for external supply of a vehicle power according to an exemplary embodiment of the present disclosure. Referring to FIG. 8, a use range of the PD sensing voltage includes PD disconnection, removal of charging connector, connection of charging connector and opening of connector latch button S3, connection of charging connector and closing of connector latch button S3, use area of discharging connector (V2L connector), and GND short circuit.

The charging and discharging control apparatus 134 may be configured to determine PD disconnection when the PD sensing voltage is 4.7 V to 5 V, removal of charging connector when it is 3.5 V to 4.7 V, connection of charging connector and opening of connector latch button S3 when it is 2.0 V to 3.5 V, connection of charging connector and closing of connector latch button S3 when 1.2 V to 2.0 V, use area of discharging connector (V2L connector) when it is 0.1 V to 1.2 V, and GND short circuit when it is 0 V to 0.1 V.

Figure 9:
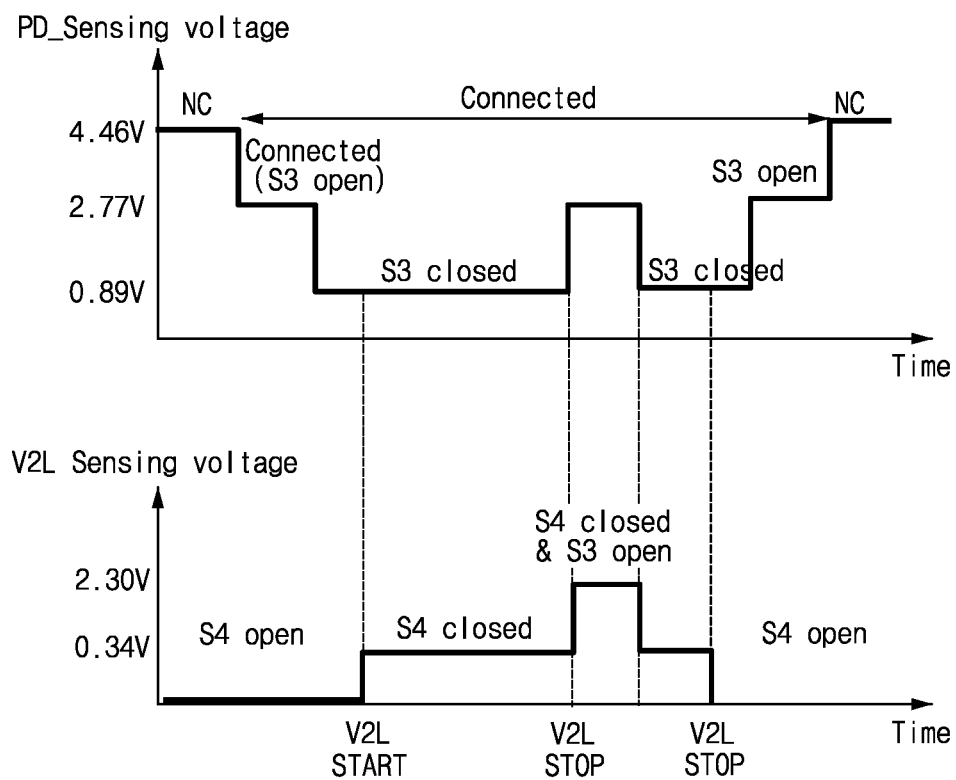
FIG. 9 illustrates a graph for describing a process of determining connection of a charging connector or a discharging connector based on a use range of a PD sensing voltage according to an exemplary embodiment of the present disclosure.

FIG. 9 illustrates a graph for describing a process of determining connection of a charging connector or a discharging connector based on a use range of a PD sensing voltage according to an exemplary embodiment of the present disclosure.

Referring to FIG. 9, when the charging connector of the charging station system is not connected to the inlet, the PD sensing voltage is sensed as a value between 3.5 to 4.7 V, to perform neither charging nor V2L. When the charging connector is connected and the connector latch button S3 is open, the PD sensing voltage between 2.0 V and 3.5V is sensed, to perform neither charging nor V2L.

When the charging connector is engaged and the connector latch button S3 is in a closed state, the charging and discharging control apparatus 134 may be configured to determine whether the charging connector or the discharging connector is connected depending on the level of the PD sensing voltage. In other words, the charging and discharging control apparatus 134 may be configured to determine that the charging connector is connected when the PD sensing voltage is between 1.2 and 2.0 V, and determine that the discharging connector (V2L dedicated connector) is connected when the PD sensing voltage is between 0.1 and 1.2 V.

After the discharging connector (V2L dedicated connector) is connected, when the discharging start button S4 is closed by pressing or otherwise engaging the discharging start button V2L START, no change is made in the PD sensing voltage, and a sensing voltage of the discharging start button V2L START increases from 0 V to 0.34 V through the CP signal line. Referring to FIG. 3, when the sensing voltage of the discharging start button V2L START becomes 0 V through the CP signal line to which the discharging connector 200 is not connected, but the switch S4 is closed, the sensing voltage of the discharging start button is increased by the resistors and the differential amplifiers 111 and 112.

$$\frac{R13}{R12 + R13} * V * \text{Amplication value} \qquad \text{Equation 1}$$

In this case, values of the resistors R11 and R15 are substantially greater compared to the resistor R12 and R13, so they are ignored. Additionally, in the above equation, V indicates an applied voltage 5V, and amplification values indicate the amplification values of the differential amplifiers 111 and 112. For example, when the amplification values of the differential amplifiers 111 and 112 are 0.3 and 3, respectively, 0.3 and 3 are multiplied.

As described above, when the sensing voltage of the discharging start button increases, discharging starts, and when the connector latch button S3 is opened during discharging, the PD sensing voltage changes to 2.77 V, thereby stopping discharging. Thereafter, when the discharging start button S4 is opened to end the discharge, the discharge is ended.

Figure 10:
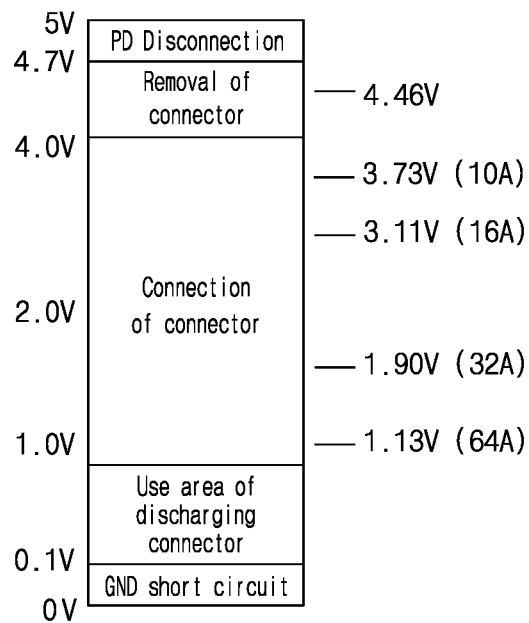
FIG. 10 illustrates an exemplary diagram of a use range of a PD sensing voltage for determining connection of a discharging connector for external supply of a vehicle power according to another exemplary embodiment of the present disclosure.

FIG. 10 illustrates an exemplary diagram of a use range of a PD sensing voltage for determining connection of a discharging connector for external supply of a vehicle power according to another exemplary embodiment of the present disclosure. Referring to FIG. 10, a use range of the PD sensing voltage includes PD disconnection, removal of charging connector, connection of charging connector, use area of discharging connector (V2L connector), and GND short circuit.

The charging and discharging control apparatus 1314 may be configured to determine PD disconnection when the PD sensing voltage is 4.7 V to 5 V, removal of charging connector when it is 4.0V to 4.7 V, connection of charging connector when it is 1.0 V to 4.0 V, use area of discharging connector (V2L connector) when it is 0.1 V to 1.0 V, and GND short circuit when it is 0 V to 0.1 V.

Figure 11:
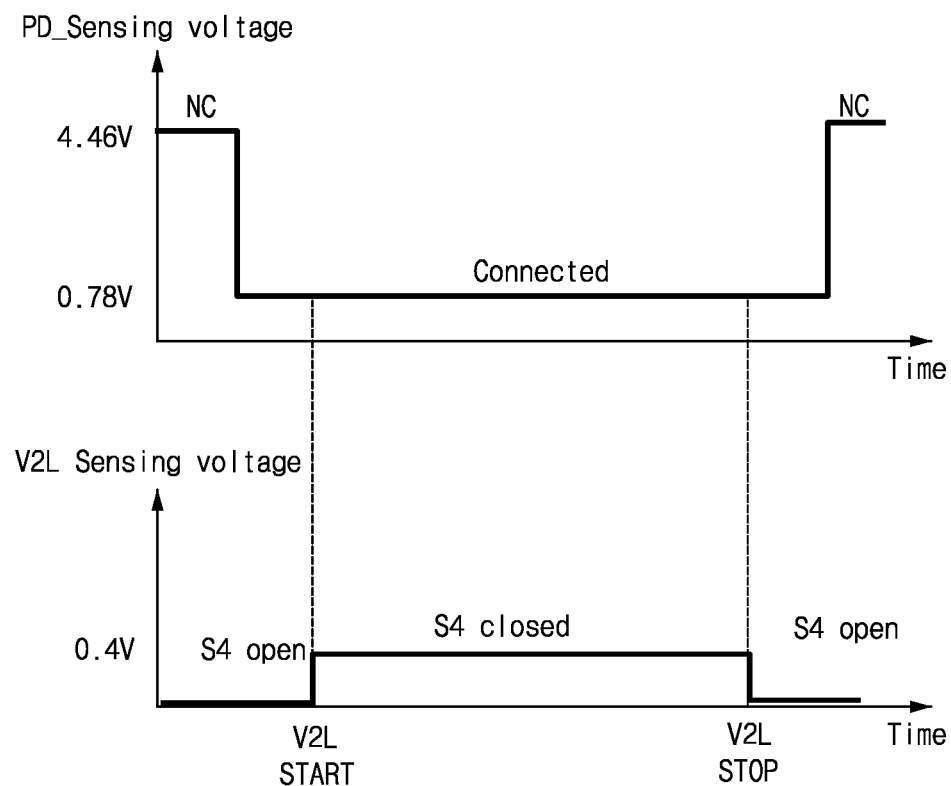
FIG. 11 illustrates a graph for describing a process of determining connection of a charging connector or a discharging connector based on a use range of a PD sensing voltage according to another exemplary embodiment of the present disclosure.

FIG. 11 illustrates a graph for describing a process of determining connection of a charging connector or a discharging connector based on a use range of a PD sensing voltage according to another exemplary embodiment of the present disclosure. Referring to FIG. 11, when the charging connector is not connected to the inlet, the charging and discharging control apparatus 1314 senses a PD sensing voltage as a range between 4.0 and 4.7 V, to perform neither charging nor V2L.

When the charging connector is connected to the inlet, the charging and discharging control device 1314 may be configured to determine whether a charging connector or a discharging connector is connected depending on a level of the PD sensing voltage. In other words, the charge and discharge control apparatus 1314 may be configured to determine that the charging connector is connected when the PD sensing voltage of 1.0 to 4.0 V is sensed, and determine that the discharging connector is connected when the PD sensing voltage of 0.1 to 1.0 V is sensed.

For the charging and discharging control apparatus 1314, a discharging start button may be pressed or otherwise engaged to close the discharging start button S4, the PD sensing voltage is not changed, and the sensing voltage of the discharging start button (V2L START) rises from 0V to 0.4V through the CP signal line. Accordingly, the charging and discharging control apparatus 1314 performs discharging and terminates the discharging when the discharging start button S4 is opened.

Figure 12:
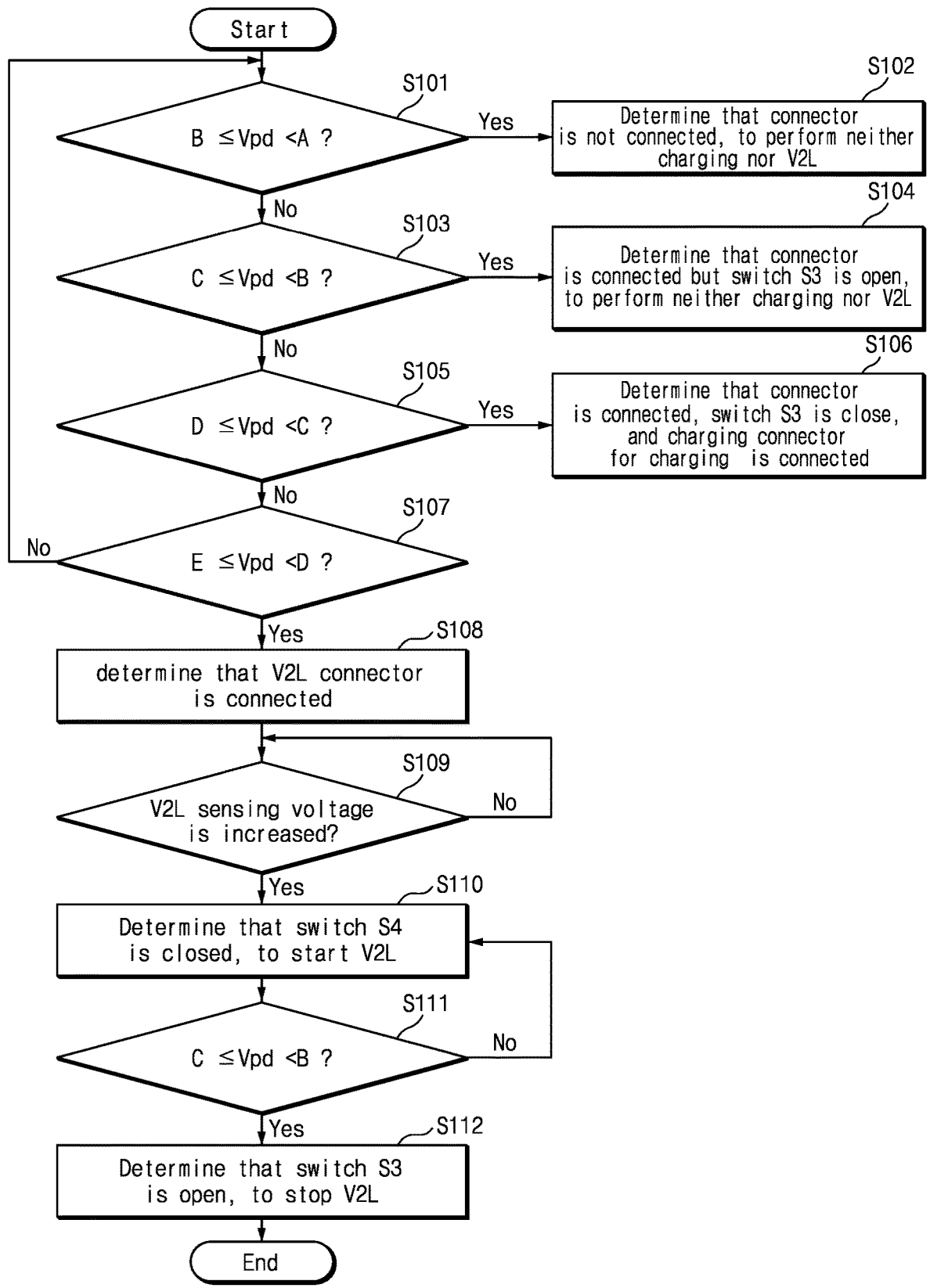
FIG. 12 illustrates a flowchart showing a method of recognizing whether a charging and discharging control apparatus for external supply of vehicle power is connected according to an exemplary embodiment of the present disclosure.

Hereinafter, a method of recognizing whether a charging and discharging control apparatus for external supply of vehicle power is connected according to an exemplary embodiment of the present disclosure will be described in detail with reference to FIG. 7. FIG. 12 illustrates a flowchart showing a method of recognizing whether a charging and discharging control apparatus for external supply of vehicle power is connected according to an exemplary embodiment of the present disclosure.

Hereinafter, it is assumed that the charging and discharging control apparatus 134 for external supply of vehicle power of FIG. 5 performs processes of FIG. 12. In addition, in the description of FIG. 12, operations described as being performed by a device may be understood as being controlled by a processor 137 of the charging and discharging control apparatus 134 for external supply of vehicle power mounted in a following vehicle.

Referring to FIG. 12, the charging and discharging control apparatus 134 may be configured to determine whether a voltage of the PD signal line, i.e., the PD sensing voltage Vpd, satisfies a predetermined reference condition for removing the connector (B or more and less than A) (S101), and when the reference condition is satisfied, determine that the connector is not connected, to perform neither charging nor discharging (V2L) (S102). For example, A may be 4.7 V and B may be 3.5 V.

On the other hand, when the PD sensing voltage Vpd does not satisfy the reference condition for removing the connector, the charging and discharging control apparatus 134 may be configured to determine whether the PD sensing voltage Vpd satisfies a condition for connection of the connector and opening of the connector latch button S3 (C or more and less than B) (S103), and when the condition is satisfied, determine that the connector is connected and the connector latch button S3 is open, to perform neither charging nor discharging (V2L) (S104). For example, C may be 2.0 V.

In addition, when the PD sensing voltage Vpd does not satisfy a condition for connection of the connector and opening of the connector latch button S3, the charging and discharging control apparatus 134 may be configured to determine whether it satisfies a condition for connection of the connector and closing of the connector latch button S3 (D or more and less than C) (S105), and when the condition is satisfied, may be configured to determine that the connector is connected and the connector latch button S3 is closed (S106). For example, D may be 1.2 V.

When the PD sensing voltage Vpd satisfies the condition for connection of the connector and closing of the connector latch button S3, the charging and discharging control apparatus 134 may be configured to determine whether it satisfies a condition for using discharging connector (E or more and less than D) (S107), and when the condition is satisfied, may be configured to determine that the discharging connector (V2L connector) is connected. For example, E may be 0.1 V. Subsequently, the charging and discharging control apparatus 134 may be configured to determine whether a discharging start button voltage V2L START has been generated (increased) (S109), and when the discharging start button voltage V2L START is generated, may be configured to determine that a discharging start button is pressed to close the discharging start button S4, to start the discharging (V2L) (S110).

The charging and discharging control apparatus 134 may be configured to determine whether the PD sensing voltage Vpd during discharging satisfies a condition for connection of the connector and opening of the connector latch button S3 (C or more and less than B) (S111), and when the condition is satisfied, may be configured to determine that the connector latch button S3 is changed to an open condition, to stop the discharging (V2L) (S112).

Figure 13:
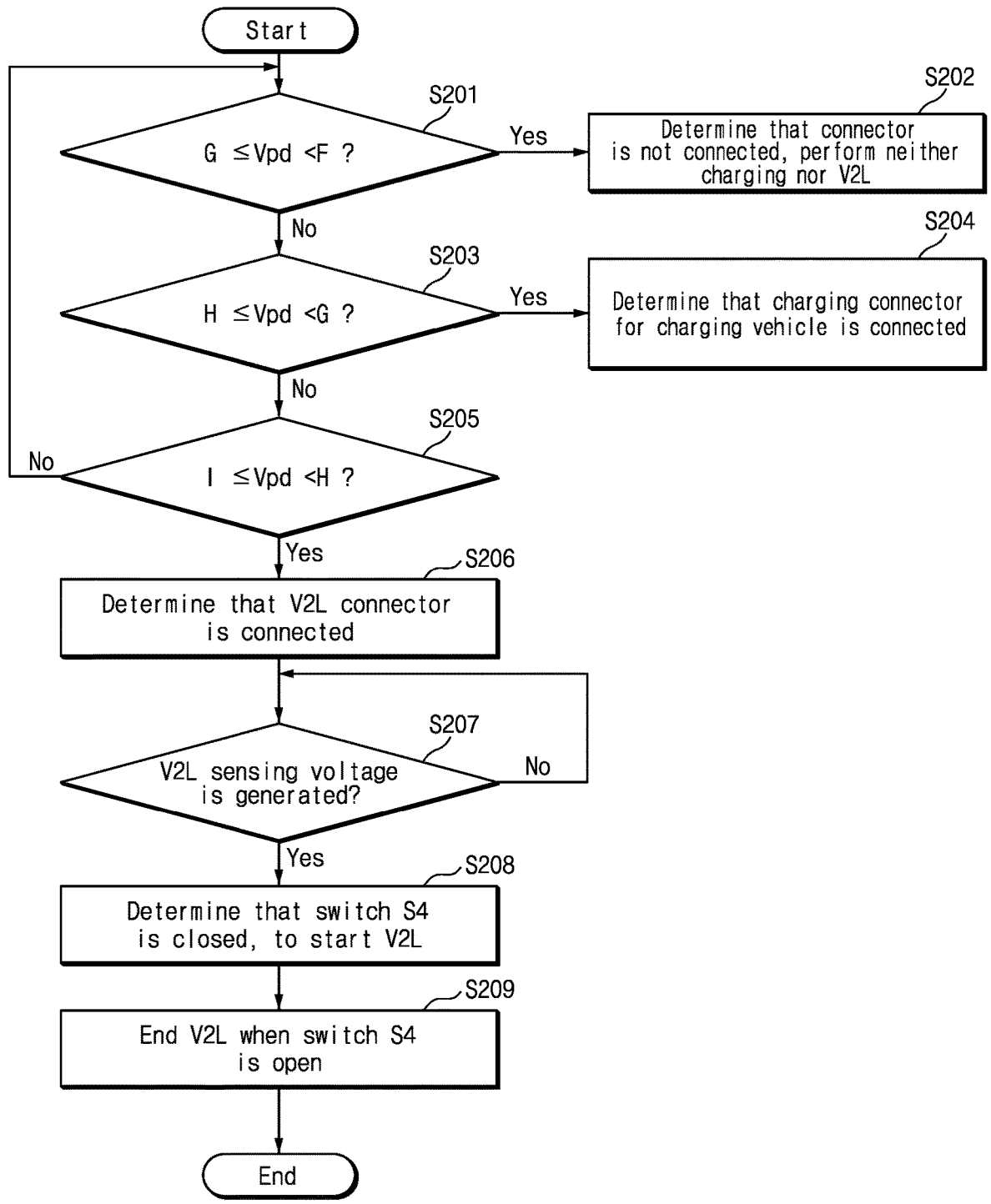
FIG. 13 illustrates a flowchart showing a method of recognizing whether a charging and discharging control apparatus for external supply of vehicle power is connected according to another exemplary embodiment of the present disclosure.

Hereinafter, a method of recognizing whether a charging and discharging control apparatus for external supply of vehicle power is connected according to another exemplary embodiment of the present disclosure will be described in detail with reference to FIG. 13. FIG. 13 illustrates a flowchart showing a method of recognizing whether a charging and discharging control apparatus for external supply of vehicle power is connected according to another exemplary embodiment of the present disclosure.

Hereinafter, it is assumed that the charging and discharging control apparatus 134 for external supply of vehicle power of FIG. 5 performs processes of FIG. 13. In addition, in the description of FIG. 13, operations described as being performed by a device may be understood as being controlled by a processor of the charging and discharging control apparatus 1314 for external supply of vehicle power 134 mounted in a following vehicle.

Referring to FIG. 13, the charging and discharging control apparatus 1314 may be configured to determine whether a voltage of the PD signal line, i.e., the PD sensing voltage Vpd, satisfies a predetermined reference condition for removing the connector (G or more and less than F) (S201), and when the reference condition is satisfied, determine that the connector is not connected, to perform neither charging nor discharging (V2L) (S202). For example, A may be 4.7 V and B may be 4.0 V.

On the other hand, when the PD sensing voltage Vpd does not satisfy the reference condition for removing the connector, the charging and discharging control apparatus 1314 may be configured to determine whether the PD sensing voltage Vpd satisfies a condition for connection of the connector (H or more and less than G) (S203), and when the condition is satisfied, determine that the charging connector is connected (S204). For example, H may be 1.0 V. When the PD sensing voltage Vpd satisfies the condition for connection of the connector, the charging and discharging control apparatus 1314 may be configured to determine whether it satisfies a condition for using discharging connector (I or more and less than H) (S205), and when the condition is satisfied, may be configured to determine that the discharging connector (V2L connector) is connected (S206). For example, I may be 0.1 V.

Subsequently, the charging and discharging control apparatus 1314 may be configured to determine whether a discharging start button voltage V2L START has been generated (increased) (S207), and when the discharging start button voltage V2L START is generated, may be configured to determine that a discharging start button is pressed to close the discharging start button S4, to start the discharging (V2L) (S208). The charging and discharging control apparatus 1314 may be configured to stop the discharging (V2L) when the discharging start button S4 is open (S209).

As described above, according to the present disclosure, it is possible to start discharging (power supply) using the button S4 of the discharging connector outside the vehicle without using a separate button in the vehicle by providing the discharging start button S4 in the discharging connector for supplying power to the outside of the vehicle. In addition, according to the present disclosure, it may be possible to recognize the connection of the discharging connector for supplying power to the outside of the vehicle without changing the PD circuit and the CP circuit that are previously used for charging, and more easily recognize the on/off of the discharging start button.

Figure 14:
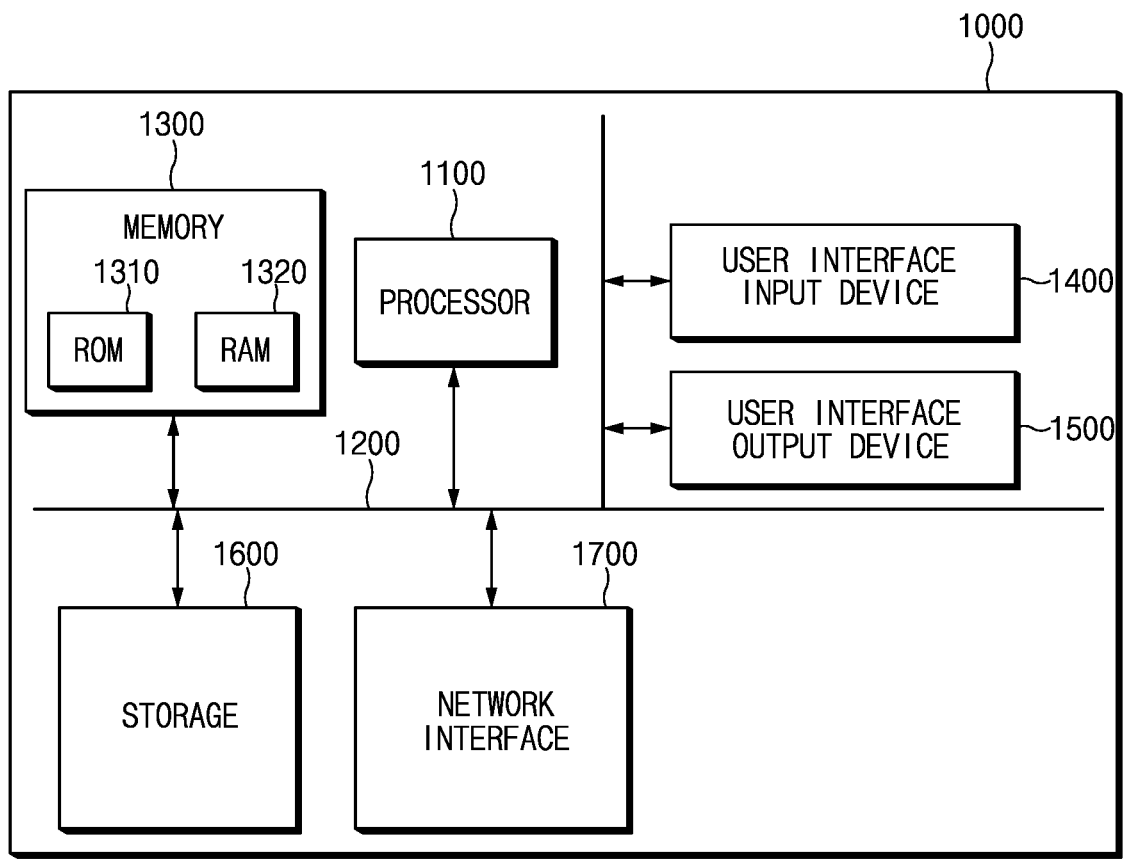
FIG. 14 illustrates a computing system according to an exemplary embodiment of the present disclosure.

FIG. 14 illustrates a computing system according to an exemplary embodiment of the present disclosure. Referring to FIG. 14, the computing system 1000 may include at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320. Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A charging and discharging control apparatus for a vehicle, comprising:
   a processor configured to control charging and discharging of electric energy of the vehicle; and
   a storage configured to store data and algorithms driven by the processor,
   wherein the processor is configured to:
      sense a voltage of a proximity detection (PD) signal line to determine whether a discharging connector for supplying a voltage to an outside of the vehicle or a charging connector for supplying a voltage to an inside of the vehicle is connected to an inlet of the vehicle,
      determine whether a PD sensing voltage sensed in the PD signal line satisfies a first voltage range, and when the first voltage range is satisfied, determine that both the charging connector and the discharging connector are not connected, to perform neither charging nor discharging,
      determine whether the PD sensing voltage satisfies a second voltage range that is lower than the first voltage range, and when the second voltage range is satisfied, determine that the charging connector is connected, to perform charging,
      determine whether the PD sensing voltage satisfies a third voltage range that is lower than the second voltage range and, when the third voltage is satisfied, determine that the discharging connector is connected, and
      determine whether a discharging start command is applied by sensing a voltage of a control pilot (CP) signal line that changes based on an open or closed state of a switch of the discharging connector when the discharging connector is connected, the discharging start command being applied when the switch of the discharging connector is determined to be in a closed state for enabling power to be discharged to the outside of the vehicle,
   wherein, when the PD sensing voltage satisfies a fourth voltage range between the first voltage range and the second voltage range determine that the charging connector of the discharging connector is connected but a connector latch switch is open, to perform neither charging nor discharging.

2. The charging and discharging control apparatus of claim 1, wherein the processor is configured to:
   determine whether a level of the CP sensing voltage sensed in the CP signal line has increased above a predetermined value in a state where the PD sensing voltage satisfies the third voltage range, and when the CP signal line has increased above the predetermined value, determine that the discharging start command is applied, to perform discharging.

3. The charging and discharging control apparatus of claim 1, wherein the processor is configured to: when the PD sensing voltage satisfies a fifth voltage range that is lower than the third voltage range while discharging is in progress, determine that the connector latch switch is open, to stop the discharging.

4. A charging and discharging control system for a vehicle, the system comprising:
   a control pilot (CP) circuit configured to receive a CP signal from a charging station system;
   a proximity detection (PD) circuit configured to determine whether a charging connector or a discharging connector is connected; and
   a charging and discharging control apparatus configured to determine whether a discharging connector for supplying a voltage to an outside of the vehicle or a charging connector for supplying a voltage to an inside of the vehicle is connected to an inlet of the vehicle by sensing a voltage of an output terminal of the PD circuit,
   wherein the charging and discharge control apparatus is configured to:
      determine whether a PD sensing voltage sensed in a PD signal line satisfies a first voltage range, and when the first voltage range is satisfied, determine that both the charging connector and the discharging connector are not connected, to perform neither charging nor discharging, and determine whether the PD sensing voltage satisfies a second voltage range that is lower than the first voltage range, and when the second voltage range is satisfied, determine that the charging connector is connected, to perform charging, determine whether the PD sensing voltage satisfies a third voltage range that is lower than the second voltage range and when the third voltage range is satisfied, determine that the discharging connector is connected, and determine whether a discharging start command is applied by sensing a voltage of an output terminal of the CP circuit that changes based on an open or closed state of a switch of the discharging connector when the discharging connector is connected, the discharging start command being applied when the switch of the discharging connector is determined to be in a closed state for enabling power to be discharged to the outside of the vehicle, wherein, when the PD sensing voltage satisfies a fourth voltage range between the first voltage range and the second voltage range, determine that the connector or the discharging connector is connected but a connector latch switch is open, to perform neither charging nor discharging.

5. The charging and discharging control system of claim 4, wherein the PD circuit includes a resistance element configured to apply a power supply voltage of a power supply voltage terminal to a PD signal line by decreasing the power supply voltage.

6. The charging and discharging control system of claim 4, wherein the CP circuit includes:
a diode configured to rectify a voltage of the CP signal;
a resistance element connected between an output terminal of the diode and a ground voltage terminal;
a first amplifier configured to amplify a voltage of an output terminal of the resistance element; and
a second amplifier configured to amplify an output voltage of the first amplifier.

7. The charging and discharging control system of claim 6, wherein the CP circuit further includes first and second buffers each configured to buffer an output voltage of the second amplifier.

8. The charging and discharging control system of claim 7, further comprising:
a first switch that is related to the discharging start button having a first side connected to the CP circuit and a second side connected to the PD circuit, and
a discharging connector configured to include a second switch that is a connector latch button provided at the second side of the first switch.

9. The charging and discharging control system of claim 8, wherein the discharging connector further includes:
a first resistance element connected between a ground voltage terminal and a PD signal line connected to the PD circuit in parallel with the second switch; and
a second resistance element connected in series between output terminals of the first resistance element and the second switch and the PD signal line.

10. The charging and discharging control system of claim 6, wherein the discharging connector further includes:
a first switch that is related to the discharging start button having a first side connected to the CP circuit and a second side connected to the PD circuit, and
a resistance element connected between a PD signal line of the PD circuit and a ground voltage terminal.

11. A charging and discharging control method for a vehicle, comprising:
determining, by a processor, whether a discharging connector for supplying a voltage to an outside of the vehicle or a charging connector for supplying a voltage to an inside of the vehicle is connected to an inlet of the vehicle by sensing a voltage of a proximity detection (PD) signal line; and
determining, by the processor, whether a discharging start command is applied by sensing a voltage of a control pilot (CP) signal line that changes based on an open or closed state of a switch of the discharging connector when the discharging connector is connected, the discharging start command being applied when the switch of the discharging connector is determined to be in a closed state for enabling power to be discharged to the outside of the vehicle, wherein determining whether the discharging connector or the charging connector is connected to the inlet of the vehicle includes:
determining whether a PD sensing voltage sensed in the PD signal line satisfies a first voltage range;
determining that both the charging connector and the discharging connector are not connected when the first voltage range is satisfied, perform neither charging nor discharging;
determining whether the PD sensing voltage satisfies a second voltage range that is lower than the first voltage range, and determining that the charging connector is connected to perform charging when the second voltage range is satisfied, and
determine whether the PD sensing voltage satisfies a third voltage range that is lower than second voltage range and, when the third voltage range is satisfied, determining that the discharging connector is connected, wherein the method further comprises:
when the PD sensing voltage satisfies a fourth voltage range between the first voltage range the second voltage range, determining that the charging connector or the discharging connector is connected but a connector latch switch is open, to perform neither charging nor discharging.

12. The charging and discharging control method of claim 11, wherein the determining of whether the discharging start command is applied includes determining whether a level of the CP sensing voltage sensed in the CP signal line has increased above a predetermined value in a state where the PD sensing voltage satisfies the third voltage range, and when the CP signal line has increased above the predetermined value, determining that the discharging start command is applied, to perform discharging.

\* \* \* \* \*